United States Patent [19]

Cwirzen et al.

[11] Patent Number: 4,742,541
[45] Date of Patent: May 3, 1988

[54] TELECOMMUNICATIONS INTERFACE WITH PROTECTOR MODULES

[75] Inventors: Casimir Cwirzen, Arlington Heights; Donald F. Jaycox, Deerfield, both of Ill.

[73] Assignee: Northern Telecom Limited, Montreal, Canada

[21] Appl. No.: 925,486

[22] Filed: Oct. 29, 1986

Related U.S. Application Data

[63] Continuation of Ser. No. 545,171, Oct. 25, 1983, abandoned.

[51] Int. Cl.⁴ .............. H04M 9/00; H04M 1/15; H01R 13/40; H01R 31/00; H02H 3/22; H02G 3/10
[52] U.S. Cl. .................. 379/412; 361/119; 379/27; 379/397; 379/442; 439/620; 439/622; 439/709; 439/718; 174/60; 174/138 F
[58] Field of Search ............... 439/709, 718, 620, 621, 439/622; 379/412, 442, 26, 27, 387, 397; 339/198 J, 198 R, 147 R, 147 P; 174/59, 60, 138 F; 361/118, 119

[56] References Cited

U.S. PATENT DOCUMENTS

| | | | |
|---|---|---|---|
| 2,649,522 | 8/1953 | Marcus | 439/622 |
| 3,560,632 | 2/1971 | Wallace | 174/138 F |
| 3,598,900 | 8/1971 | Drake | 174/138 F |
| 4,071,696 | 1/1978 | Anderson | 439/372 |
| 4,080,039 | 3/1978 | Ahroni | 439/622 |
| 4,159,500 | 6/1979 | Baumbach et al. | 379/412 |
| 4,178,061 | 12/1979 | Ahroni | 439/622 |
| 4,191,985 | 3/1980 | Phillips, Jr. | 361/119 |
| 4,195,194 | 3/1980 | Kuster et al. | 174/59 |
| 4,215,381 | 7/1980 | Heisinger | 361/119 |
| 4,220,391 | 9/1980 | Krolak et al. | 439/540 |
| 4,274,691 | 1/1981 | Abernathy et al. | 439/507 |
| 4,290,664 | 8/1981 | Davis et al. | 379/442 |
| 4,296,991 | 10/1981 | Hughes et al. | 379/442 |
| 4,303,296 | 12/1981 | Spaulding | 379/325 |
| 4,313,147 | 1/1982 | Uchida et al. | 379/331 |
| 4,317,154 | 2/1982 | Passarella | 361/119 |
| 4,343,527 | 8/1982 | Harrington et al. | 379/442 |
| 4,407,559 | 10/1983 | Meyer | 439/536 |
| 4,410,226 | 10/1983 | Adduci et al. | 174/138 F |
| 4,415,044 | 11/1983 | Davis | 174/59 |
| 4,431,251 | 2/1984 | Krantz | 439/608 |
| 4,438,477 | 3/1984 | Cawley | 379/412 |
| 4,449,015 | 5/1984 | Hotchkiss et al. | 174/138 F |
| 4,560,839 | 12/1985 | Dillard | 379/339 |
| 4,573,100 | 2/1986 | Fasano | 337/32 |
| 4,583,954 | 4/1986 | Chapman, Jr. et al. | 29/756 |
| 4,613,732 | 9/1986 | Cwirzen et al. | 361/119 |
| 4,617,602 | 10/1986 | Dolansky et al. | 361/119 |
| 4,624,514 | 11/1986 | Smith | 361/119 |
| 4,626,955 | 12/1986 | Cwirzen | 361/124 |

OTHER PUBLICATIONS

Northern Telecom ad, "Telephony", Jul. 9, 1984, pp. 58–59.
General Cable ad, "Telephony", Jul. 2, 1984, pp. 18–19.

Primary Examiner—Jin F. Ng
Assistant Examiner—Danita R. Byrd
Attorney, Agent, or Firm—Schwartz, Jeffery, Schaab, Mack, Blumenthal & Evans

[57] ABSTRACT

An interface for connection between incoming telephone lines and the customers equipment has a base for mounting on a support surface, with terminals for connection of incoming telephone lines and one or more plug-in positions for plug-in modules. Protectors are positioned in the modules. Each module has a modular jack. An intermediate cover fits over and is attached to the base, covering also the modules but with one or more apertures for access to the jack or jacks. The conductors from the customers equipment either terminate in modular plugs which insert directly into the jacks or terminate in spade terminals which are connected to terminals on the intermediate cover. In the latter case, a short interconnect cable connects at one end to these terminals and at the other end has a modular plug for insertion into a jack. An outer cover extends over the intermediate cover and the modular jack or jacks.

8 Claims, 5 Drawing Sheets

TELECOMMUNICATIONS INTERFACE WITH PROTECTOR MODULES

This is a continuation of application Ser. No. 545,171, filed Oct. 25, 1983 and now abandoned.

BACKGROUND OF THE INVENTION

This invention relates to a telecommunications interface with protector modules, and in particular is concerned with an interface mounted at a subscribers premises for interconnection between the incoming telephone lines and the customers equipment.

SUMMARY OF THE INVENTION

It is becoming desirable, and in some instances a requirement, that there be demarcation between the telephone lines of the telephone company and the wiring for telephones at a customers premises. Also, the telephone company at least prefers access to all of its lines, up to the demarcation position, at all times. The present invention provides an interface, which can be mounted externally at a customers premises, or at a readily accessible position, and which provides for ready interconnection by providing modular jacks into which modular plugs at the end of the customers wiring can be plugged. The customers wiring can be connected by directly plugging in if modular plugs are attached to the wiring, or if spade terminals are on the ends of the conductors of the wiring, an intermediate connection to a short length of cable with a plug can be made. The interface is normally in sections, whereby only an outer cover need be removed by the customer or connection.

The invention broadly provides an interface having a base for mounting on a support surface and having terminals for connection of incoming telephone lines, plug-in modules connecting to the terminals, the modules having modular jacks, protector means in the modules, an intermediate cover attached to the base and having apertures for access to the modular jacks and an outer cover extending over the intermediate cover and any plugs entered in the jacks.

BRIEF DESCRIPTION OF THE DRAWINGS

The invention will be readily understood by the following description of certain embodiments, by way of example, in conjunction with the accompanying drawings, in which.

DETAILED DESCRIPTION OF THE PREFERRED EMBODIMENTS

Figure 1:
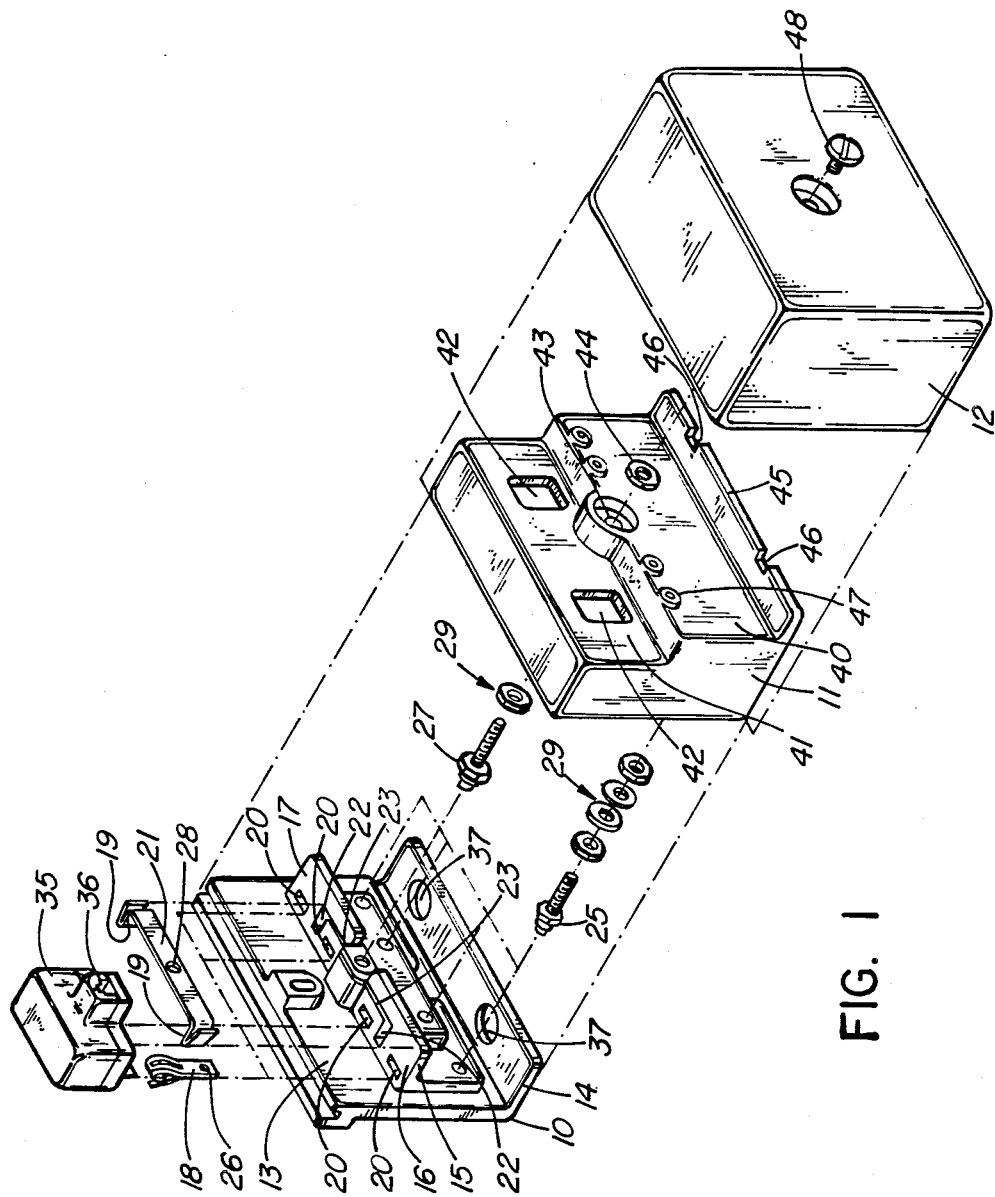
FIG. 1 is an exploded perspective view of one form of interface.

FIG. 1 illustrates an interface assembly composed of a base 10, an intermediate cover 11 and an outer cover 12. The base is mounted on a support surface, for example a wall, and comprises a back wall 13 with a forward projecting web 14 along the bottom edge and a further forward projecting web 15 at an intermediate position between the top and bottom of the back wall. The intermediate web 15 has two three-pin plug-in positions at 16 and 17. Each position has two line terminals 18 and a ground terminal 19. Only one line terminal is shown for clarity, but a line terminal is positioned in each line terminal aperture 20. The ground terminals 19 are formed at the ends of a continuous strip 21, with the terminals 19 positioned in ground terminal apertures 22. The strip 21 is positioned in a slot or groove 23 joining the apertures 22.

Line studs 25 are inserted into the back wall 13 being connected to the line terminals 18 by means of holes 26 in the terminals. A ground stud 27 is inserted in the intermediate wall 15, making contact with the ground terminal strip 21 via a hole 28 in the strip. The studs 25 and 27 are threaded, having nuts and washers indicated generally at 29 for attachment of incoming telephone company lines.

Figure 8:
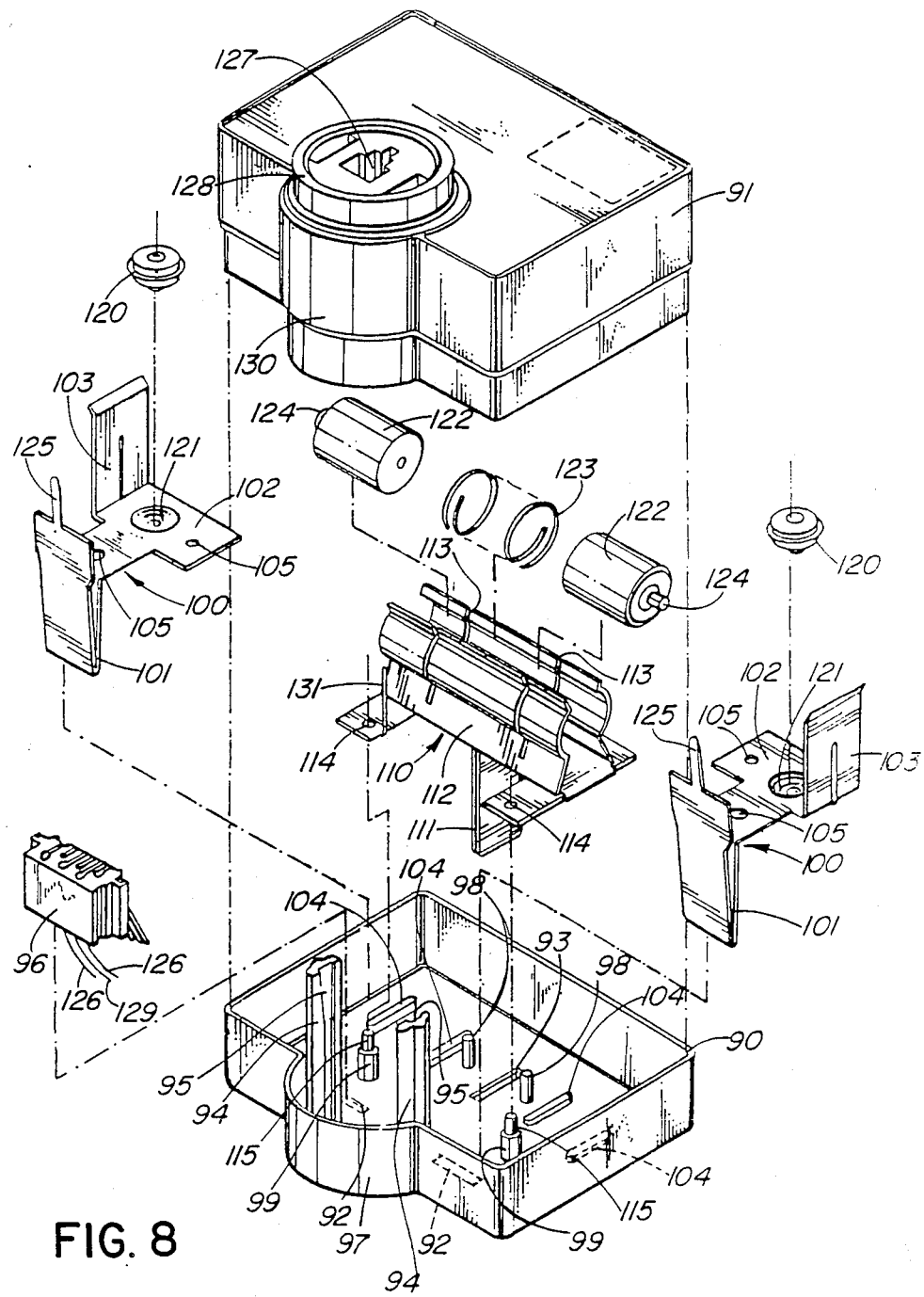
FIG. 8 illustrates a module having protector means.

Plugging-in to the positions 16 and 17 on the intermediate web 15 are two modules 35. The modules have forward facing jacks 36 and contain protector means which prevent the lines from damage if an overload occurs. FIG. 8 illustrates a module 91 having protector means 120.

FIG. 8 illustrates a module in which the jack axis and the module insertion axis are parallel. The module illustrated has a base 90 and a top 91 which combine to form an enclosure. In the base are two slots 92 for line terminals and a slot 93 for a ground terminal. Two pillars 94 extend up from the inner bottom surface of the base, the pillars having opposed grooves 95 in which slides a contact member 96 for a modular jack. The base has an arcuate portion 97 at a jack position. Mounting posts 98 and 99 extend up from the bottom surface of the base for mounting and positioning of terminals in the housing.

Two line terminals are indicated at 100. Each line terminal has a blade portion 101 which extends down through a slot 92. At the top of the blade portion an L-shaped portion extends, comprising a support portion 102 extending generally normal to the blade portion, and a contact portion 103 extending normal to the support portion. In position, the support portions 102 rest on ribs 104 on the bottom surface of the base 90, holes 105 allowing passage of the posts 98 and 99. The contact portions are adjacent the ends of the base, with the support portions extending towards each other.

A ground terminal member 110 has a blade portion 111 which extends through slot 93 and a tubular protector holding portion 112 which is divided into three portions by slits 113. In position, the protector holding portion rests on top of the posts 98, and is located by holes 114 which fit over to portions 115 of the posts 99, the portions 115 being of smaller diameter than the lower parts of the posts. This maintains a gap between the portion 112 of the ground terminal member 110 and the line terminals 100.

Positioned between the support portions 102 of the line terminals and the protector holding portion 112 of the ground terminal are back-up protectors 120. The protectors rest in recesses 121 formed in the support portions 102. Positioned in the tubular protector holding portion 112 of the ground terminal 110 are two protectors 122 spaced by a compression spring 123. The outer ends of the protectors 122 have projecting members 124 which make contact with the associated contact portion 103. The casings of the protectors are of conductive material and are in contact with the portion 112 of the ground terminal. Tabs 125 on the line terminals provide for connection of conductors 126 from the contact member 96.

In operation, direct connection exists between the incoming lines, to which the blade portions 101 of the line terminals are connected, and the customers equipment connected by a plug in the jack, via the tabs 125 and conductors 126. On occurrence of an overvoltage, there is a breakdown in one or both protectors 122 to ground. Protectors 122 are generally of the gas tube type with two spaced electrodes sealed in a housing, the gap at subatmospheric pressure. If a protector 122 becomes faulty, as by leakage, resulting in an unacceptably high breakdown voltage characteristic, then the back-up protectors 120 will break down at a slightly higher voltage than that of protectors 122 when in operating condition. However, the back-up protectors are of the type which fail to a short or very low breakdown voltage condition after a minimal number of breakdowns.

The top 91 can be attached to the base by any convenient way, for example snapping together or by bonding. The cover has an arcuate portion 130 which matches arcuate portion 97 in the base, and the profiled aperture 127 for a modular plug is formed in a boss 128 extending into the arcuate portion 130. The incoming telephone lines are brought in through holes 37 in the bottom web 14, and then attached to the studs 25, with a ground connection to stud 27. Two sets of telephone lines can be brought in, one set connected to one plug position 16 and the other set connected to plug position 17. However only one set of lines need be brought in and only one plug position used. It is also possible to bring in one set of lines, connected to one plug position, and interconnect conductors positioned to connect in the other plug position.

The intermediate cover 11 fits over the base 10. The intermediate cover has a front wall which is in two parts, the lower part 40 being further forward than the upper part 41. In the upper part two apertures 42 are provided, through which project very slightly the jacks 36. The front face of the jacks can be flush with the front face of the part 41, or even recessed, provided easy plugging-in if a modular plug is available.

The studs 25 do not extend through the intermediate cover but are contained within the lower part of the intermediate cover. In the example, stud 27 extends through the intermediate cover, via hole 43 at the upper edge of the lower part 40. Nut 44 holds the intermediate cover in place. A web 45 extends forward at the bottom edge of the intermediate cover and slots 46 provide for entry of customers wiring.

Figure 6:
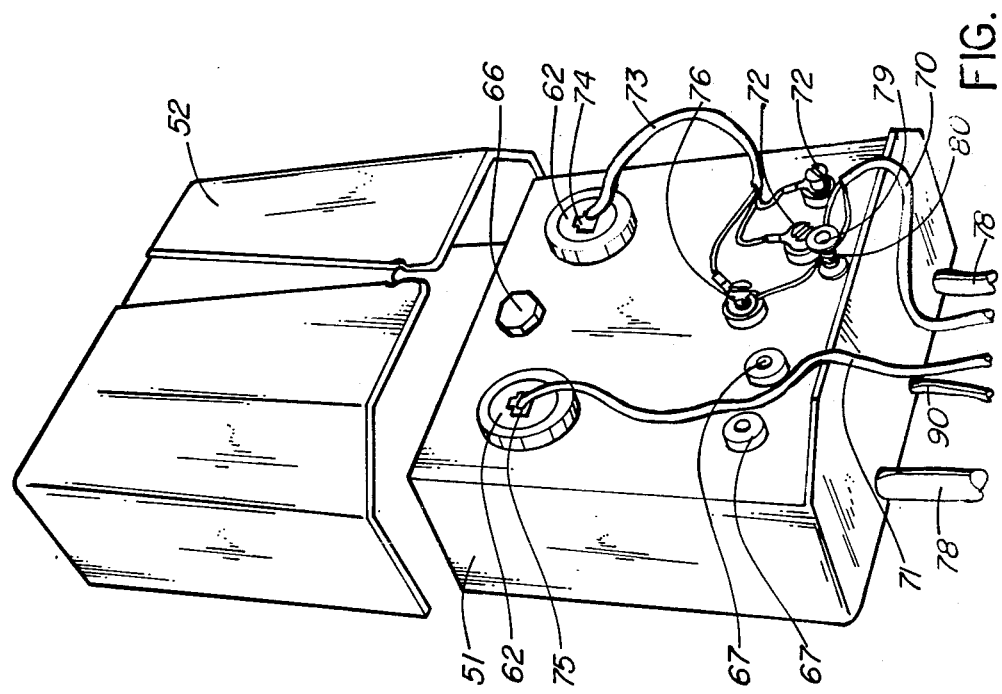
FIG. 6 is a perspective view of the interface of FIG. 2 with the intermediate cover on the base.

Normally, the base is mounted on the support surface, the telephone companies lines connected to the studs 25 and 27 and the intermediate cover placed in position and fastened. The customer does not need access behind the intermediate cover as the customers connection is by plugging in to the jacks 36 accessible through the apertures 42. If the customers wiring ends in modular plugs then these are inserted directly into the jacks 36. If the customers wiring ends with spade terminals, studs can be inserted into bosses 47 on the front of portion 40. The spade terminals are first connected to the studs and then a short length of interconnect cable also attached at one end to the studs, with the other end of the cable having a plug. This is illustrated in FIG. 6.

Once the customers wiring has been connected, to one or both jacks 36, the front cover 12 is put over the intermediate cover. The front cover is held in position by a hollow screw 48 which screws on to the end of the stud 27.

FIGS. 2 to 7 illustrate an alternative form of interface having a different type of module. In the example of FIG. 1, assuming the back wall of the interface assembly is vertical, the modules 35 plug in vertically, while the insertion of plugs into the jacks 36 is horizontal. That is the insertion direction for the jacks is normal to the insertion direction of the module. In the arrangement of FIGS. 2 to 7 the modules insert in the same direction as the insertion into the jacks, this usually being horizontal.

Figure 2:
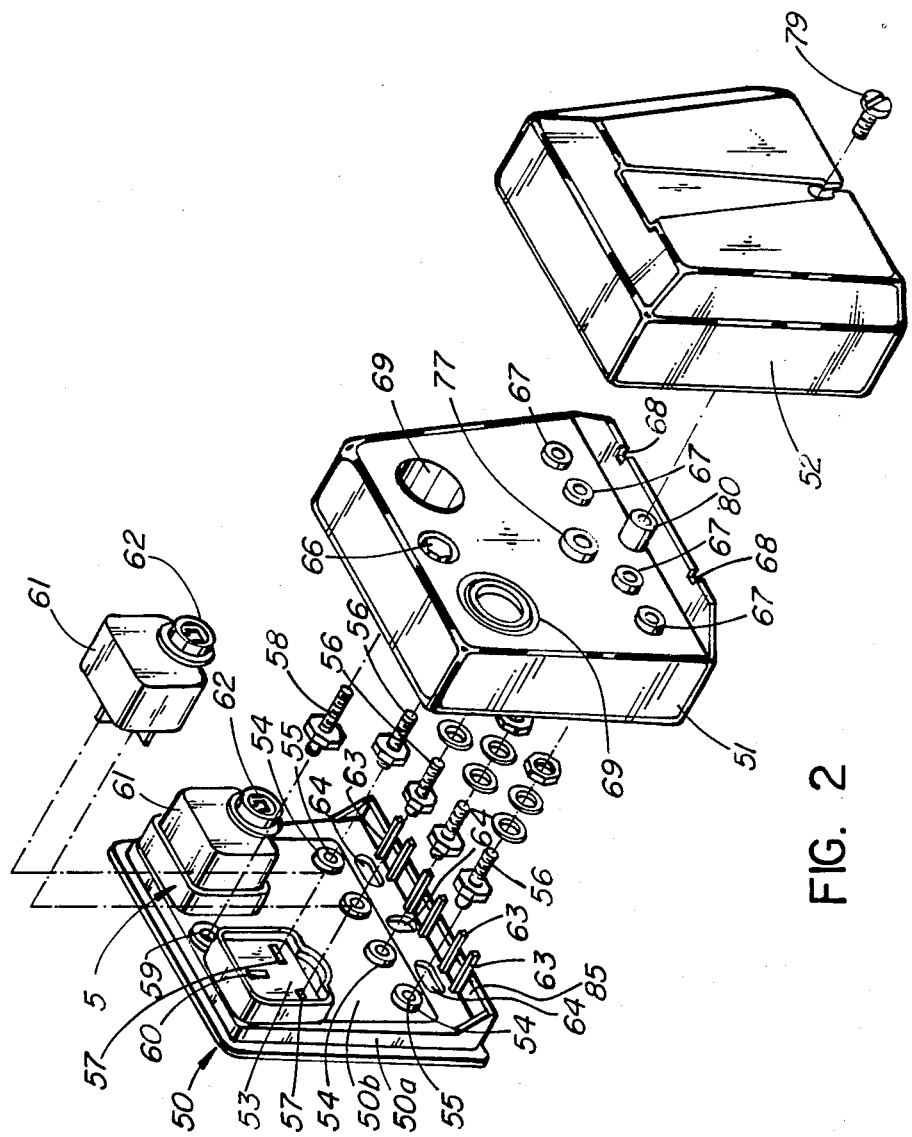
FIG. 2 is an exploded perspective view of another form of interface.

As particularly seen in FIG. 2, the interface assembly comprises a base having two parts, a base bottom 50a and a base top 50b, referred to generically as the base 50; an intermediate cover 51; and a front or outer cover 52. The base is mounted on a support surface, normally a wall and has two three-pin plug-in positions 53 near the top edge. Below the plug-in positions is a row of bosses 54 having bores 55, into which are mounted threaded studs 56. The rear ends of the studs 56 are connected to suitable contact members which carry terminal positions positioned behind the terminal apertures 57. The incoming telephone line conductors, Tip and Ring, are attached to the front ends of the studs 56, and thus via the contact members to the terminals in apertures 57. A further stud 58 extends through a boss 59 and is connected to a ground contact member which has terminal positions behind apertures 60. A plug in module 61 can be positioned at the position 53. The modules have forward facing jacks 62.

Figure 3:
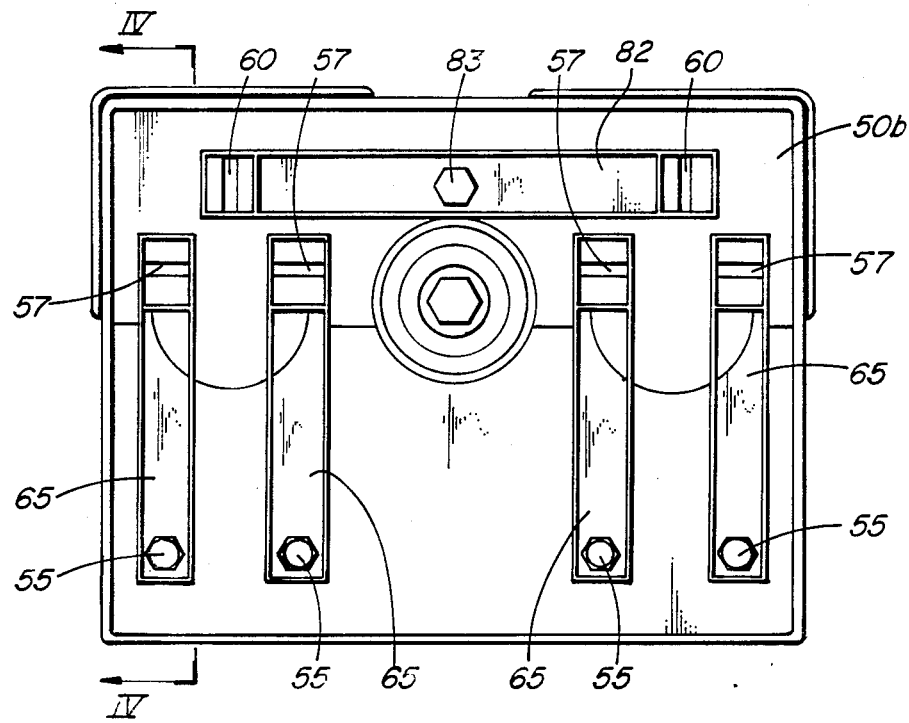
FIG. 3 is a view on the back surface of the base top, with contact members removed, of the interface of FIG. 2.
Figure 4:
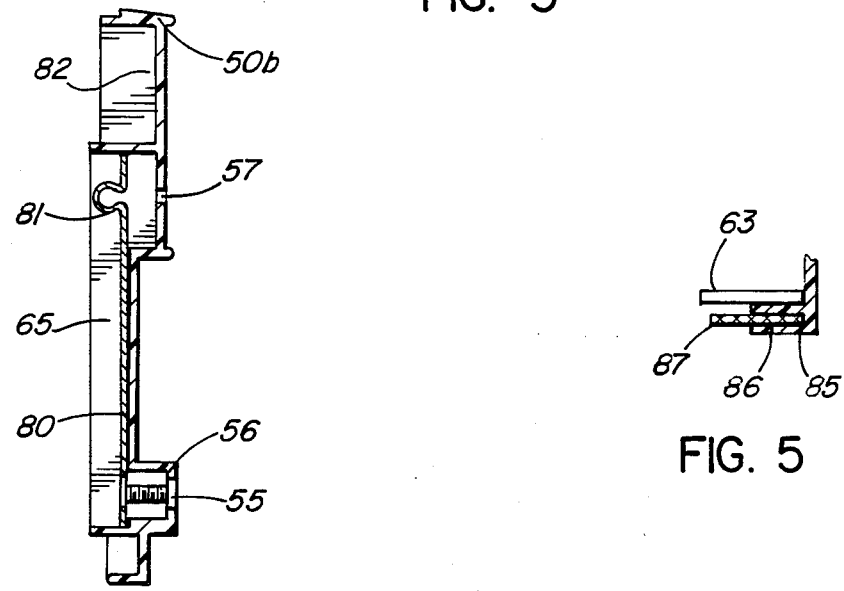
FIG. 4 is a cross-section on the line IV—IV of FIG. 3, with contact members in place.

FIG. 3 is a view on the rear or back surface of the base top 50b. The terminal apertures 57 are shown, as are also the ground apertures 60. The studs 56, FIG. 2, pass through the base top, via holes in the bosses 55. Nuts on the studs sit in hexagonal portions of the bores 55 and carry contact members which extend up to the terminal apertures 57. The contact members are positioned in channels 65 defined on the back surface of the base top. This is seen clearly in FIG. 4 where a contact member 80 is shown positioned in a channel 65. At its lower end the contact member is attached to a stud 56 and at its upper end the contact member has a formed terminal position 81. Somewhat similar is a transverse channel 82 at the top of the base top. A bore 83 in the boss 59 (FIG. 3) communicates with this channel and a contact member extends along the channel being attached to a stud 58 extending through bore 83. At each end the contact member would have a formation similar to that at 81 for contact member 80. Contact blades on a module 61 pass through the apertures 57 and 60 and make contact with the terminal formations on the contact members.

The telephone company lines can be brought in between pairs of guide and locating ribs 63 at the bottom of the base. As an alternative they can be fed through from behind the base through apertures 64. Only one pair of lines need be connected, or two pairs. If one pair only is brought in only one module may be used, or both modules used by suitable interconnection.

Figure 5:
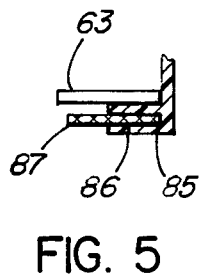
FIG. 5 is a cross-section illustrating a seal.

As shown in FIG. 2, at the lower edge of the base there is a forwardly extending rib 85. Rib 86 has a laterally extending slot 86 therein as shown in FIG. 5. In the slot, an assembly of the interface unit, a strip of elastomeric material is positioned, as shown at 87 in FIG. 5. A similar arrangement of a rib, this time extending rearwardly, is provided at the lower edge of the intermediate cover 51. This rib also has a slot therein. On assembly of the intermediate cover to the base, the elastomeric material 87 extends into the slot in the intermediate cover. When a telephone line is brought in between a pair of guide and locating ribs 63, the elastomeric material is deformed at that position. Small semi-circular grooves are formed in the front edges of the ribs on the base and intermediate cover to accommodate telephone lines. Alternatively, a strip of elastomeric material can be positioned in each slot and arranged to abut on assembly of the intermediate cover to the base.

The intermediate cover 51 is fitted over the base 50, as seen in FIG. 6, with the jacks 62 projecting into apertures 69 in the intermediate cover. The studs 56 do not extend through the intermediate cover, being contained within it. The ground stud 58 is accessible through the intermediate cover, a hollow captive screw 66 engaging on the outer end of the stud 58 and holding the intermediate cover in place.

A row of bosses 67 near the bottom of the intermediate cover provide for mounting of studs, not shown in FIG. 2, for use when the customers wiring does not end in a modular plug. This is as in FIG. 1. The customers wiring is brought in, via slots 68 in a bottom web 69 of the intermediate cover. If the wiring ends in a plug it is connected directly to the jack by insertion of the plug. If the wiring has spade terminals, then they are connected to studs in the bosses 67, and a short interconnect cable 73 with spade terminals at one end and a plug at the other is used as an interconnection. This is illustrated in FIG. 6, the customers wiring indicated at 70 and 71. The wiring at 70 has spade terminals which are connected to studs 72.

The short interconnect cable 73 is connected at one end to the studs 72 and has a plug 74 at the other end inserted into one jack 62. The wiring 71 has a plug 75 at its end which is inserted directly in the other jack 62. At further stud 76 is mounted in a boss 77 and serves to connect the ground conductor of the wiring 70 to the ground conductor of the cable 73. The incoming telephone company lines are indicated at 78. A separate ground conductor is shown at 90.

Figure 7:
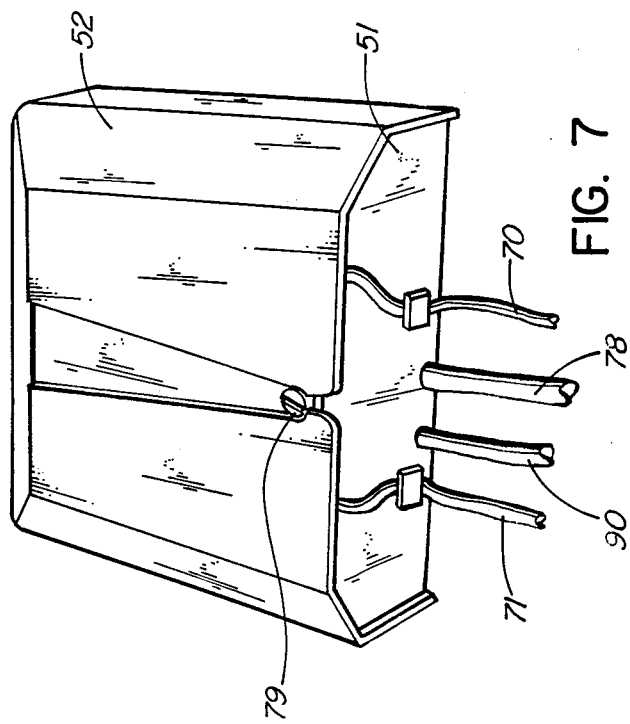
FIG. 7 is a perspective view of the interface of FIG. 2 with the outer cover in place.

The front or outer cover 52 fits over the intermediate cover 51, and is held in place by a screw 79 which engages in a boss 80 on the intermediate cover. Normally, the customer only needs to remove the outer cover to connect his wiring. Access behind the intermediate cover is normally only by telephone company personnel. The modules 61 generally contain protectors. The completely assembled interface, with front or outer cover in place, is illustrated in FIG. 7. FIG. 7 illustrates an alternative arrangement of incoming telephone company lines. In FIG. 7 a single four-conductor line is indicated at 78. The separate ground conductor is shown at 90.

What is claimed is:

1. A telecommunications interface for connection between incoming telephone lines and customer equipment, comprising:

a base for mounting on a support surface and including terminals for connection of incoming telephone lines and a plug-in receptacle electrically connected with said terminals;

entry means in said base for receiving telephone lines for attachment to said terminals;

at least one plug-in module provided with plug-in means for electrically connecting said module with said plug-in receptacle, the module including a housing on a modular jack supported by said housing;

said modular provided with protector means located in said module housing;

an intermediate cover attached to said base and extending over said module and said terminals, the intermediate cover including an aperture for access to said modular jack;

terminals also mounted on said intermediate cover for also permitting connection of conductors from customer equipment, and an interconnect cable electrically connected with said with said terminals of the intermediate cover and provided with a modular plug for insertion in the modular jack;

entry means in said intermediate cover for receiving conductors of customer equipment to said modular jack; and an outer cover extending over said intermediate cover and means for attaching said outer cover to said intermediate cover.

2. The interface as claimed in claim 1 including two sets of terminals, and two plug-in modules, a module connected to each set of terminals; said intermediate cover including two apertures, one for each module.

3. An interface as claimed in claim 2, wherein said sets of terminals are each connected to a plug-in position of said receptacle, said plug-in means for electrically connecting the module including elements inserted into said plug-in positions in a direction parallel to the plane of the base, each said modular jack having an insertion direction normal to the plane of the base.

4. An interface as claimed in claim 2, wherein said sets of terminals are each connected to a plug-in position of said receptacle, said plug-in means for electrically connecting the module including elements inserted into said plug-in positions in a direction normal to the plane of the base, each said modular jack having an insertion direction normal to the plane of the base.

5. The interface as claimed in claim 4, said base including a base bottom and a base top connected together and including contact members positioned between said base bottom and said base top, said terminals mounted in said base top and said plug-in positions formed in said base top, said contact members extending between said terminals and said plug-in positions.

6. The telecommunications interface as claimed in claim 1, wherein said intermediate cover extends across the substantial entirety of said base.

7. A telecommunications interface for connecting incoming telephone lines and user-provided equipment comprising:

base means for supporting said interface on a support surface;

terminals formed on said base means electrically connectable to incoming telephone lines;

a socket formed on said base means and including terminal apertures electrically connected with said terminals;

removable plug-in module means including a housing, a modular jack supported by said housing and connector elements inserted into said socket for supporting electrical connections between said terminals and a corresponding terminal in said modular jack;

protector means arranged in said housing for protecting user-provided equipment from damage due to a voltage surge on incoming telephone lines;

an intermediate cover removably attached to said base means and covering said base means and plug-in module except for said modular jack;

said intermediate cover including intermediate terminals adapted to receive said conductors, the interface further comprising an interconnect cable electrically connected to said terminals and to said modular jack;

an outer cover removably attached to said intermediate cover and covering said intermediate cover; and said modular jack being adapted to receive conductors electrically connected to user provided equipment whereby said conductors are received in said modular jack through said intermediate cover before said outer cover is attached to said intermediate cover.

8. A telecommunications interface for connection between incoming telephone lines and customer equipment, comprising:

a base for mounting on a support surface and including terminals for connection of incoming telephone lines and a plug-in receptacle electrically connected with said terminals;

entry means in said base for receiving telephone lines for attachment to said terminals;

at least one plug-in module provided with plug-in means for electrically connecting said module with said plug-in receptacle, the module including a housing and a modular jack supported by said housing;

said module provided with protector means located in said module housing;

an intermediate cover attached to said base and extending over said module and said terminals, the intermediate cover including an aperture for access to said modular jack;

entry means in said intermediate cover for receiving conductors of customer equipment to said modular jack;

an outer cover extending over said intermediate cover and means for attaching said outer cover to said intermediate cover; and a forward extending rib along the bottom of the base and a rearwardly extending rib along the bottom of the intermediate cover, the ribs in opposition, a slot extending into each rib from its outer edge, and an elastomeric member extending into each slot, and grooves in the front edges of the ribs for passage of conductors between said ribs.

* * * * *